US007900004B2

(12) United States Patent
Gallaher et al.

(10) Patent No.: US 7,900,004 B2
(45) Date of Patent: Mar. 1, 2011

(54) CONVERTING BACKUP COPIES OF OBJECTS CREATED USING A FIRST BACKUP PROGRAM TO BACKUP COPIES CREATED USING A SECOND BACKUP PROGRAM

(75) Inventors: Shannon Lyn Gallaher, Tucson, AZ (US); Glenn Randle Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 11/845,009

(22) Filed: Aug. 24, 2007

(65) Prior Publication Data
US 2009/0055606 A1  Feb. 26, 2009

(51) Int. Cl.
*G06F 17/30* (2006.01)
*G06F 17/40* (2006.01)
*G06F 12/16* (2006.01)

(52) U.S. Cl. .................. 711/162; 707/634; 707/635; 707/639

(58) Field of Classification Search ............ 709/246; 711/161, 162; 707/204, 634–639
See application file for complete search history.

(56) References Cited

U.S. PATENT DOCUMENTS

| 6,026,414 A * | 2/2000 | Anglin ................ 707/204 |
| 6,397,308 B1 | 5/2002 | Ofek et al. |
| 7,065,620 B2 | 6/2006 | Ballard et al. |
| 7,415,585 B1 * | 8/2008 | Rossi .................. 711/162 |
| 7,516,286 B1 * | 4/2009 | Dalal et al. ........... 711/162 |
| 2005/0193038 A1 * | 9/2005 | Pearson et al. ........ 707/203 |
| 2007/0043841 A1 | 2/2007 | Cannon et al. |
| 2007/0061385 A1 | 3/2007 | Clark et al. |
| 2007/0276884 A1 * | 11/2007 | Hara et al. ............ 707/204 |

OTHER PUBLICATIONS

International Search Report and Written Opinion dated Dec. 9, 2008 for Application No. PCT/EP2008/060392 filed Jul. 8, 2008.
Amendments Under Article 19 dated Feb. 4, 2009 for International Application No. PCT/EP2008/060392.
Symantec, "Symantec Backup Exec 9.2 for NetWare Servers-Maximizing Network-Hosted Data Protection", [online] Sep. 6, 2005, pp. 1-14, document No. XP002505266, retrieved from the internet: http://eval.symantec.com/mktginfo/enterprise/white_papers/wp_benw_92_maximizing_protection_v3.pdf [retrieved on Nov. 24, 2008] p. 6, line 9-31.

* cited by examiner

*Primary Examiner*—Brian R Peugh
*Assistant Examiner*—Nicholas Simonetti
(74) *Attorney, Agent, or Firm*—David W. Victor; Konrad Raynes & Victor LLP

(57) ABSTRACT

Provided are a method, system, and article of manufacture for converting backup copies of objects created using a first backup program to backup copies created using a second backup program. A plurality of backup copies of versions of an object are created using a first backup program, wherein the object has an object name. The first backup program is used to restore at least one of the backup copies to a restored version of the object having a name different from the object name. A second backup program is used to create a backup copy of each restored version of the object. A name of a designated object is assigned to each backup copy created using the second backup program. Metadata of each backup copy created using the second backup program is updated with metadata for the designated object.

33 Claims, 4 Drawing Sheets

Backup Copy Inventory Entry

Object Metadata

CONVERTING BACKUP COPIES OF OBJECTS CREATED USING A FIRST BACKUP PROGRAM TO BACKUP COPIES CREATED USING A SECOND BACKUP PROGRAM

BACKGROUND OF THE INVENTION

1. Field of the Invention

The present invention relates to a method, system, and article of manufacture for converting backup copies of objects created using a first backup program to backup copies created using a second backup program.

2. Description of the Related Art

When creating a backup copy of an object, a vendor backup and recovery software product typically creates a proprietary backup copy that can only be recovered by the product that created the backup copy. To migrate from one backup product to another, the backup copies created using the existing product need to be converted to the format of the new product.

One technique for converting backup copies created using a currently deployed backup program for use with a new backup program involves using the current backup program to restore the backup copies for each object, beginning with the oldest, with a new name that varies from the original object name from which the backup copies were created using the current backup program. The original object is temporarily renamed. For each restored backup copy, beginning with the oldest, the restored copy is renamed to the original name of the object and a backup copy of the restored object is created with the new backup program. The restored copy is then deleted. After all the copies have been processed, the original object is renamed back to the original object name. With this described technique, the original object is unavailable during the time that the object has the temporary name and the new backup copies are being created.

Another technique for converting backup copies created using a current backup program for use by a new backup program involves restoring each backup copy for an object with a new name, i.e., one that varies from the original object name. For each restored backup copy, beginning with the oldest, a backup copy is created using the new backup program and the new backup program inventory for that backup copy is updated to indicate that the backup copy is for the original object name as opposed to the temporary name to which the backup copy was restored. The restored copy is then deleted. During this restore process, the meta-data stored in the internal structure of the backup copy represents the restored object's temporary name instead of the original name. This problem is typically addressed at the time of restoring the backup copy having the temporary object name using the new backup program.

There is a need in the art for improved techniques for converting a backup copy created from a first backup program to a backup copy for use with a second backup program.

SUMMARY

Provided are a method, system, and article of manufacture for converting backup copies of objects created using a first backup program to backup copies created using a second backup program. A plurality of backup copies of versions of an object are created using a first backup program, wherein the object has an object name. The first backup program is used to restore at least one of the backup copies to a restored version of the object having a name different from the object name. A second backup program is used to create a backup copy of each restored version of the object. A name of a designated object is assigned to each backup copy created using the second backup program. Metadata of each backup copy created using the second backup program is updated with metadata for the designated object.

In a further embodiment, the designated object whose name is assigned to each backup copy created using the second backup program comprises the object from which the plurality of backup copies were created using the first backup program.

In a further embodiment, the object from which the plurality of backup copies were created using the first backup program comprises a first object having a first object name. The designated object whose name is assigned to each backup copy created using the second backup program comprises a second object having a second object name different from the first object name.

In a further embodiment, the metadata of the backup copies created using the second backup program is updated with at least one storage management policy indicated in the metadata of the designated object to replace the at least one storage management policy in the backup copies created using the second backup program.

In a further embodiment, the at least one storage management policy is a member of a set of storage management policies comprising an object expiration, a migration policy, and a backup policy.

In a further embodiment, the metadata of each backup copy created using the second backup program is updated with metadata in the designated object indicating an object name of the designated object to replace metadata in each backup copy created using the second backup program indicating the object name of the backup copy.

In a further embodiment, the metadata of each backup copy created using the second backup program is updated with metadata in the designated object indicating a directory structure in which the designated object resides.

In a further embodiment, the metadata of each backup copy created using the second backup program is updated with metadata in the designated object related to a storage location of the designated object.

In a further embodiment, a backup copy inventory is updated to indicate that each backup copy created using the second backup program has the name of the designated object.

In a further embodiment, each restored version of the object restored using the first backup program is deleted.

In a further embodiment, the first and second backup programs are from different vendors.

In a further embodiment, users have access to the object during the operations of using the first backup program to restore each backup copy to the restored version of the object, using the second backup program to create the backup copy of each restored version, assigning the name of the designated object to each backup copy, and updating the metadata of each backup copy.

DETAILED DESCRIPTION

Figure 1:
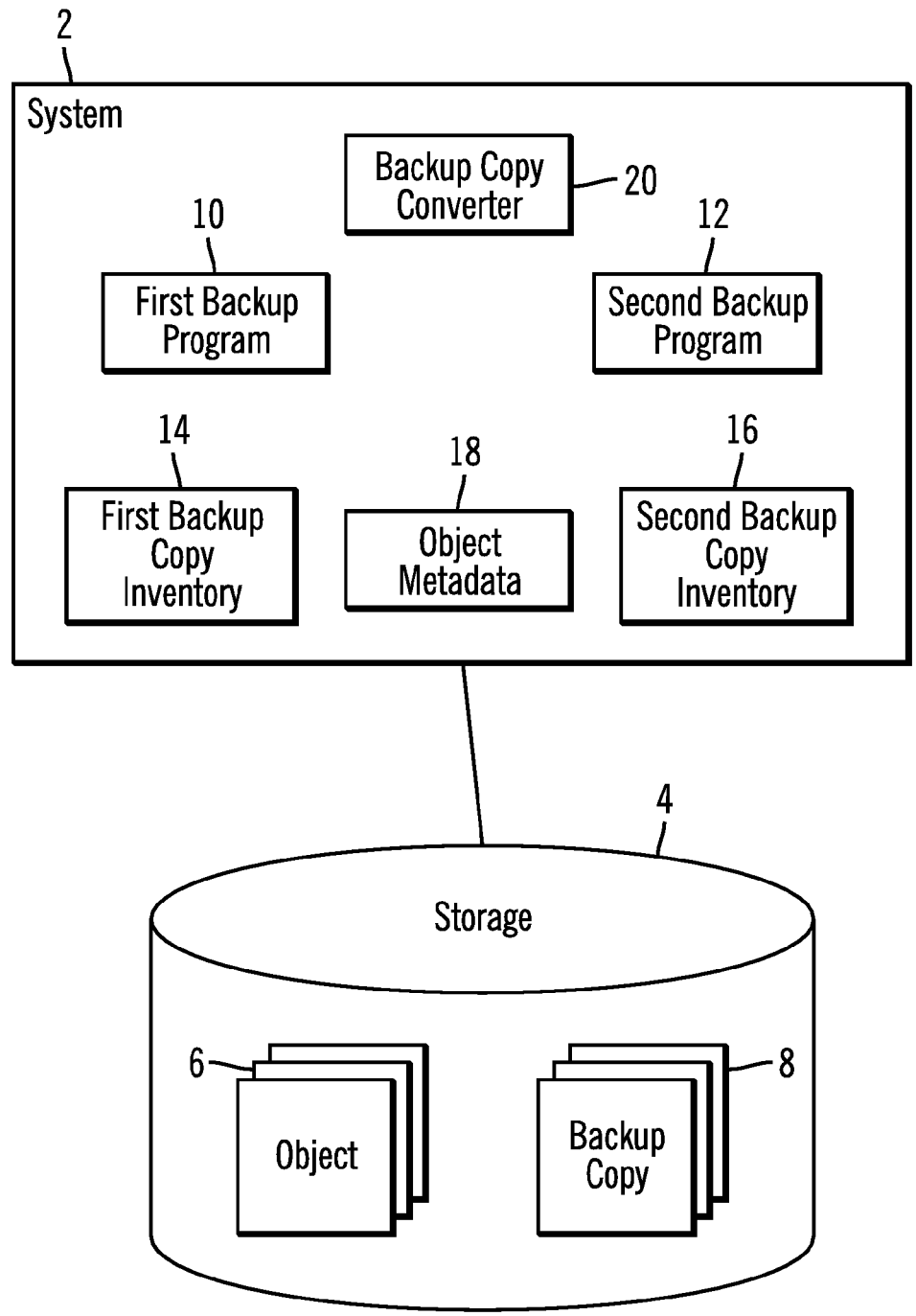
FIG. 1 illustrates an embodiment of a system for converting backup copies of objects.

FIG. 1 illustrates an embodiment of a system 2 in communication with a storage 4 having a plurality of objects 6 and backup copies 8 for one or more of the objects 6. Backup copies 8 for one object 6 comprise backup copies of versions of the object at different points-in-time. There may be one or more backup copies 8 for one or more of the objects 6. The backup copies 8 may be created using a first backup program 10 or a second backup program 12. The backup programs 10 and 12 may comprise backup and restore software from different vendors, different products from a same vendor or different versions of a same product from one vendor.

The first backup program 10 and second backup program 12 maintain information on backup copies 8 created using their respective software in a first backup copy inventory 14 and a second backup copy inventory 16, respectively, which may comprise a database or other information store. Object metadata 18 may also be maintained for the objects 6 and backup copies 8. Object metadata 18 may be included within the internal structure of the object 6 and backup copy 8 or maintained in a database or information store separate from the object 6 or backup copy 8.

A backup copy converter 20 automatically converts backup copies 8 created using the first backup program 10 to backup copies 8 created using the second backup program 12. A user may use the converter 20 to migrate backup copies 8 to a different backup program upon changing to a new backup program.

An object 6 may comprise a file system, database object, group of files, or any other data set or grouping of data known in the art that is suitable for backing-up as a backup copy.

The system 2 may comprise a suitable computational device known in the art, such as a server, desktop computer, workstation, mainframe, hand held computing device, telephony device, etc. The storage 4 may be implemented in a storage system known in the art, such as a storage system including a plurality of storage devices, e.g., interconnected hard disk drives (a Redundant Array of Independent Disks (RAID)), Just a Bunch of Disks (JBOD), Direct Access Storage Device (DASD), disks connected in a loop configuration (serial loop, Fibre Channel Arbitrated Loop), a single storage device, a tape library, an optical library, a network attached storage (NAS), etc. The system 2 and storage 4 may communicate over a network, direct cable or wireless transmission medium.

Figure 2:
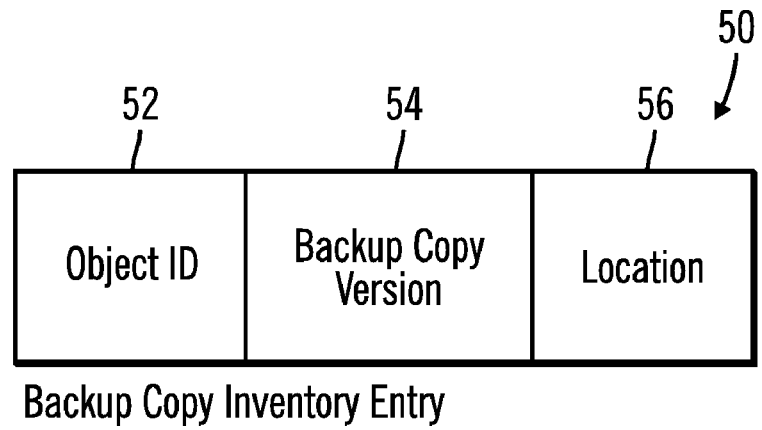
FIG. 2 illustrates an embodiment of an entry for a backup copy in a backup copy inventory.

FIG. 2 illustrates an embodiment of a backup copy inventory entry 50 in the first 14 and second 16 backup copy inventories. A backup copy inventory entry 50 may include an object identifier (ID) 52 identifying the object 6 from which the backup copy was created; a backup copy version 54 indicating a version of the backup copy, which may be a version number or timestamp; and a location 56 of the backup copy 8. Additional or different information may also be included in the entry 50.

Figure 3:
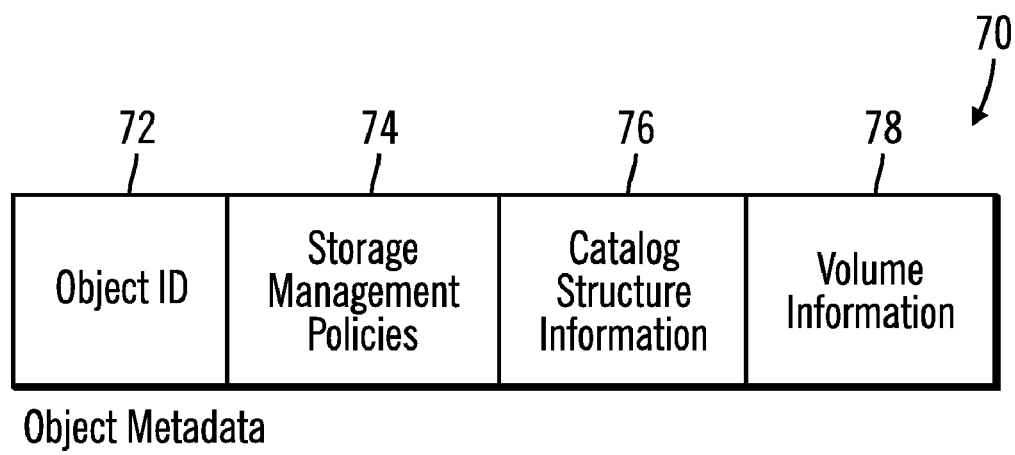
FIG. 3 illustrates an embodiment of object metadata.

FIG. 3 illustrates an embodiment of object metadata 70 for an object 6 and backup copy 8 of an object 6. Object metadata 70 may include an object identifier (ID) 72 identifying the object 6 or backup copy 8 to which the metadata applies; storage management policies 74 for the object 6 or backup copy 8, such as an expiration policy, a migration policy to another storage, and a backup or archival policy; catalog structure information 76, such as physical location or directory structure in which the object 6 or backup copy 8 resides; and volume information 78, such as a volume record descriptor, volume table of contents and other information on the one or more volumes in which the object 6 or backup copy 8 resides. The metadata 70 may include additional information on the object 6 and backup copy 8.

Figure 4:
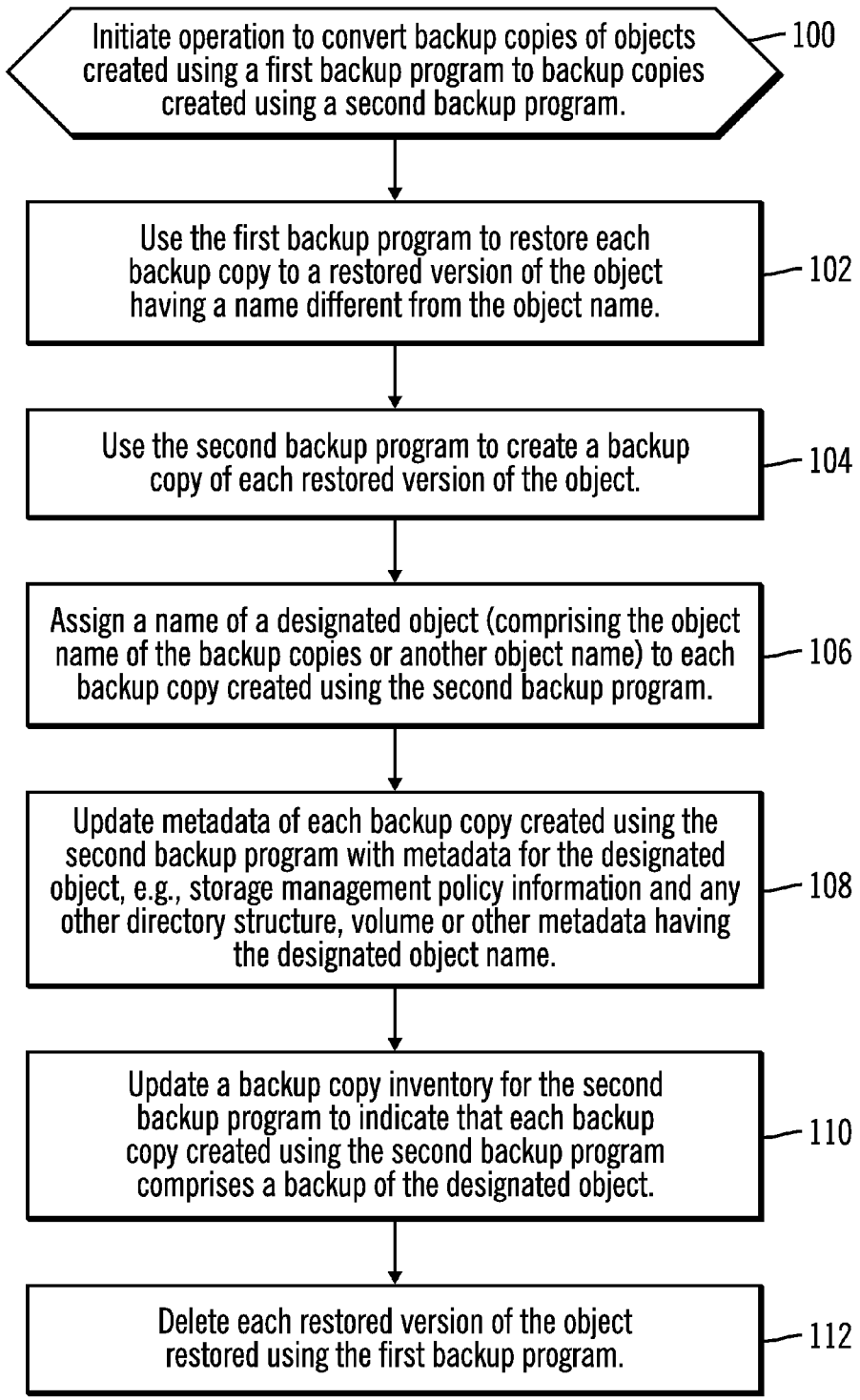
FIG. 4 illustrates embodiments of operations to convert backup copies of objects created using a first backup program to backup copies created using a second backup program.

FIG. 4 illustrates an embodiment of operations performed by the backup copy converter 20 to convert backup copies 8 created using the first backup copy program 10 to backup copies created using the second backup copy program 12. Upon initiating (at block 100) an operation to convert backup copies created using the first backup program 10 from a backup object 6, e.g., backup copies $A_1 \ldots A_n$ created from backup object A where n is the number of backup copies, the backup copy converter 20 uses, e.g., invokes, (at block 102) the first backup program 10 to restore each backup copy 8 for an object 6 to a restored version of the object 8 having an object name different from the object name. For instance, if the original object is named A and has backup copies $A_1 \ldots A_n$, each restored version may have an object name, e.g., A' different from the original object name A, resulting in restored objects $A'_1 \ldots A'_n$. The backup copy converter 20 uses (at block 104) the second backup program 12 to create a backup copy of each restored version of the object. For instance, the second backup program 12 may create backup copies of the restored objects $A'_1 \ldots A'_n$, resulting in backup copies $A'_1 \ldots A'_n$.

The backup copy converter 20 assigns (at block 106) a name of a designated object (comprising the object name from which the restored backup copies were generated, e.g., A, or another object name) to each backup copy, e.g., backup copies of $A'_1 \ldots A'_n$, created using the second backup program 12, resulting in backup copies $DN_1 \ldots DN_n$, wherein "DN" is the designated object name. The designated object name may comprise the name of the object from which the plurality of backup copies were created using the first backup program, e.g., A. For example, if the initial backup copies were created from object "A", then the backup copies $A'_1 \ldots A'_n$ created using the second backup program 12 are assigned the name "A", resulting in backup copies $A_1 \ldots A_n$ from the second backup program 12. In a further embodiment, the designated object name (DN) may be for an object, e.g., object "B", that that is a different name than the object name "A" from which the restored backup copies, e.g., $A'_1 \ldots A'_n$, were created (at block 102) using the first backup program 10.

The backup copy converter 20 updates (at block 108) metadata 70 for each backup copy created using the second backup program 12, assigned the name of the designated object, e.g., $DN_1 \ldots DN_n$, with metadata 70 for the designated object, e.g., storage management policies 74, catalog structure information 76, and/or volume information 78. In a further embodiment, the backup copy object metadata may be updated with any metadata from the designated object that indicates the name of the designated object, so that the metadata 70 for the converted backup copies, e.g., $DN_1 \ldots DN_n$, is updated to reflect the designated name, which may comprise the name of the original object, e.g., object A, from which the backup copies to convert were created, or a different object name. In certain situations, if the designated name comprises the original object name, e.g., object A, from which the original backup copies $A_1 \ldots A_n$, were created, the metadata 70 of the original object may have changed following the creation of the original backup copies, e.g., $A_1 \ldots A_n$. In such case, updating the metadata of the backup copies $A_1 \ldots A_n$ created using the second backup program 12 will capture recently updated metadata from the original object, e.g., object A.

In one embodiment, the operations at blocks 104-108 may be performed for each backup object, such that at the time of creating one backup copy of a restored version of the object, e.g., $A'_i$, the designated name, $DN_i$, is assigned, and the metadata 70 for the backup copy $DN_i$ is stored. In this way, the operations 104-108 are triggered for each object so that the operations at blocks 104-108 may be performed for one object before being performed for a subsequent object. Alternatively, the operations may be performed for all objects at each block 104-108 before proceeding to a subsequent block, such that after all the backup copies are restored, then all the designated names are assigned, and then the metadata for the designated named backup copies are updated.

The backup copy converter 20 updates (at block 110) the second backup copy inventory 16 for the second backup program 12 to indicate that each backup copy created using the second backup program 12, e.g., $DN_1 \ldots DN_n$, comprises a backup of the designated object. For instance, updating the second backup copy inventory 16 may involve changing the object ID 52 in the entries 50 (FIG. 2) for each backup copy $DN_1 \ldots DN_n$, created using the second backup program 12, to the name of the designated object. If the object metadata 70 is stored separately from the object, then the object ID 72 of the metadata 70 for the backup copies, $DN_1 \ldots DN_n$, may be updated to indicate the designated object name.

The backup copy converter 20 may then delete (at block 112) each restored version of the object, e.g., objects $A'_1 \ldots A'_n$, restored using the first backup program 10 at block 102 in FIG. 4.

In one embodiment, the backup copy converter 20 may automatically convert all backup copies 8 created using the first backup program 10 indicated in the first backup copy inventory 14. Alternatively, the backup copy converter 20 may automatically convert backup copies 8 for one or more selected objects 6. The designated object name may be provided by the user of the backup copy converter 20 via a user interface or command line when invoking the backup copy converter 20.

In one embodiment, the operations of creating the backup copy using the second backup program 12, updating the metadata, updating the second backup copy inventory 16, and deleting the restored backup copy at blocks 104-112 in FIG. 4 may be performed starting from the oldest backup copy, e.g., $A_n$.

Described embodiments provide operations to convert backup copies of an object created using a first backup program to backup copies created using a second backup program. Further, with certain embodiments, users may have continual access to the objects while the backup copies for the object are being converted because the original object 6 from which the backup copies were created using the first backup program 10 is not renamed or otherwise made unavailable during the conversion process.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 5:
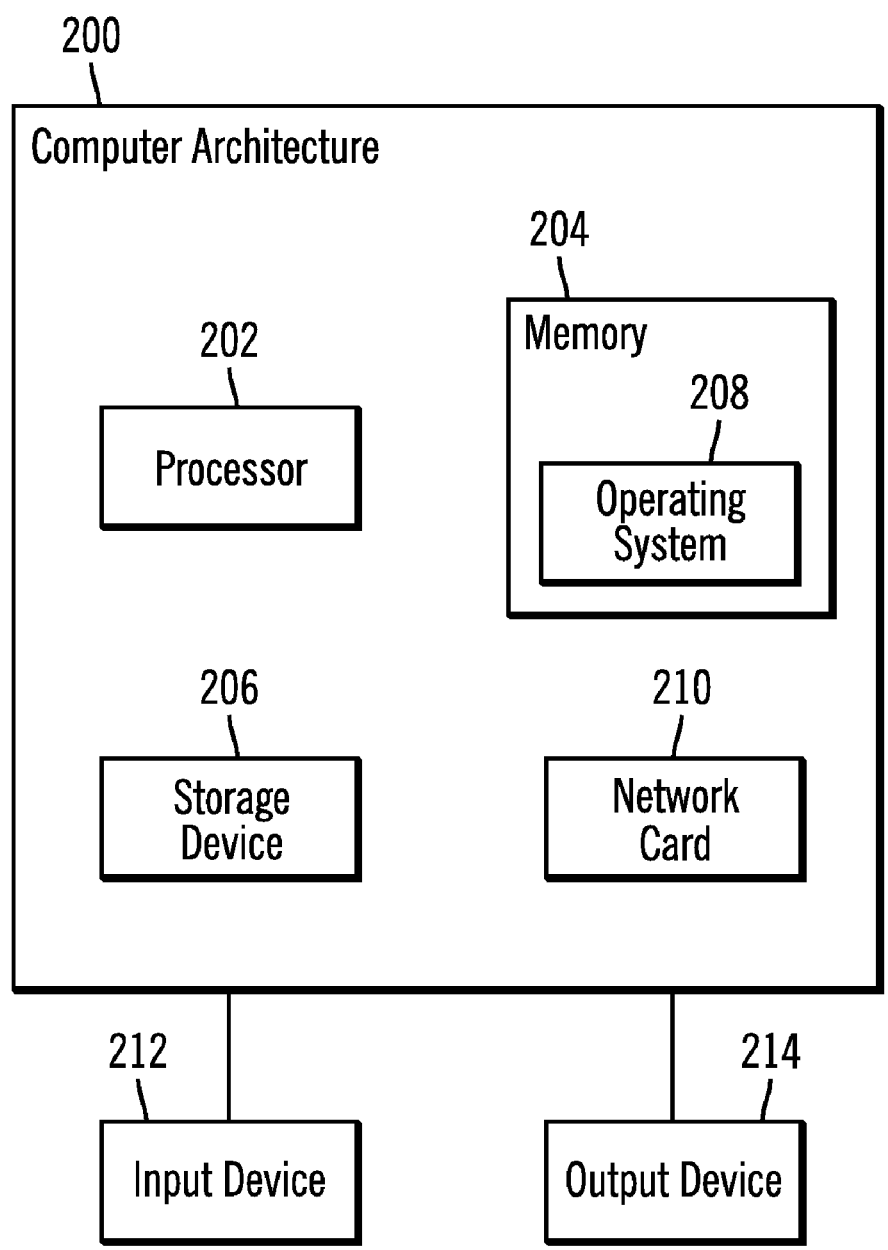
FIG. 5 illustrates an embodiment of a computer architecture that may be used with the system in FIG. 1.

FIG. 5 illustrates one implementation of a computer architecture 200 that may be implemented for the system 2 of FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs, including an operating system 208, device drivers and application programs, in the storage 206 are loaded into the memory 204 and executed by the processor 202 in a manner known in the art. The architecture further includes a network card 210 to enable communication with a network. An input device 212 is used to provide user input to the processor 212, and may include a keyboard, mouse, pen-stylus, microphone, touch sensitive display screen, or any other activation or input mechanism known in the art. An output device 214 is capable of rendering information transmitted from the processor 212, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements or when used with different instances of the same element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining a plurality of backup copies of versions of an object created using a first backup program, wherein the object has an object name;
   using the first backup program to restore at least one of the backup copies to a restored version of the object having a name different from the object name;
   using a second backup program to create a backup copy of each restored version of the object, wherein the first and second backup programs are from different vendors;
   assigning a name of a designated object to each backup copy created using the second backup program; and
   updating metadata of each backup copy created using the second backup program with metadata for the designated object.

2. The method of claim 1, wherein the designated object whose name is assigned to each backup copy created using the second backup program comprises the object from which the plurality of backup copies were created using the first backup program.

3. The method of claim 1, wherein the object from which the plurality of backup copies were created using the first backup program comprises a first object having a first object name, wherein the designated object whose name is assigned to each backup copy created using the second backup program comprises a second object having a second object name different from the first object name.

4. The method of claim 1, wherein the metadata of the backup copies created using the second backup program is updated with at least one storage management policy indicated in the metadata of the designated object to replace the at least one storage management policy in the backup copies created using the second backup program.

5. The method of claim 4, wherein the at least one storage management policy is a member of a set of storage management policies comprising an object expiration, a migration policy, and a backup policy.

6. The method of claim 1, wherein the metadata of each backup copy created using the second backup program is updated with metadata in the designated object indicating an object name of the designated object to replace metadata in each backup copy created using the second backup program indicating the object name of the backup copy.

7. The method of claim 1, wherein the metadata of each backup copy created using the second backup program is updated with metadata in the designated object indicating a directory structure in which the designated object resides.

8. The method of claim 1, wherein the metadata of each backup copy created using the second backup program is updated with metadata in the designated object related to a storage location of the designated object.

9. The method of claim 1, further comprising:
   updating a backup copy inventory to indicate that each backup copy created using the second backup program has the name of the designated object.

10. The method of claim 1, further comprising:
    deleting each restored version of the object restored using the first backup program.

11. The method of claim 1, wherein users have access to the object during the operations of using the first backup program to restore each backup copy to the restored version of the object, using the second backup program to create the backup copy of each restored version, assigning the name of the designated object to each backup copy, and updating the metadata of each backup copy.

12. A system, comprising:
    a first backup program;
    a second backup program;
    a storage having objects and a plurality of backup copies of versions of an object created using the first backup program, wherein the object has an object name;
    a backup copy converter to perform operations, the operations comprising:
    using the first backup program to restore at least one of the backup copies to a restored version of the object having a name different from the object name;
    using the second backup program to create a backup copy of each restored version of the object, wherein the first and second backup programs are from different vendors;

assigning a name of a designated object to each backup copy created using the second backup program; and updating metadata of each backup copy created using the second backup program with metadata for the designated object.

13. The system of claim 12, wherein the designated object whose name is assigned to each backup copy created using the second backup program comprises the object from which the plurality of backup copies were created using the first backup program.

14. The system of claim 12, wherein the object from which the plurality of backup copies were created using the first backup program comprises a first object having a first object name, wherein the designated object whose name is assigned to each backup copy created using the second backup program comprises a second object having a second object name different from the first object name.

15. The system of claim 12, wherein the metadata of the backup copies created using the second backup program is updated with at least one storage management policy indicated in the metadata of the designated object to replace the at least one storage management policy in the backup copies created using the second backup program.

16. The system of claim 15, wherein the at least one storage management policy is a member of a set of storage management policies comprising an object expiration, a migration policy, and a backup policy.

17. The system of claim 12, wherein the metadata of each backup copy created using the second backup program is updated with metadata in the designated object indicating an object name of the designated object to replace metadata in each backup copy created using the second backup program indicating the object name of the backup copy.

18. The system of claim 12, wherein the metadata of each backup copy created using the second backup program is updated with metadata in the designated object indicating a directory structure in which the designated object resides.

19. The system of claim 12, wherein the metadata of each backup copy created using the second backup program is updated with metadata in the designated object related to a storage location of the designated object.

20. The system of claim 12, further comprising:

a backup copy inventory, wherein the backup copy converter operations further comprise updating the backup copy inventory to indicate that each backup copy created using the second backup program has the name of the designated object.

21. The system of claim 12, wherein the backup copy converter operations further comprise:

deleting each restored version of the object restored using the first backup program.

22. The system of claim 12, wherein users have access to the object during the operations of using the first backup program to restore each backup copy to the restored version of the object, using the second backup program to create the backup copy of each restored version, assigning the name of the designated object to each backup copy, and updating the metadata of each backup copy.

23. An article of manufacture including a backup copy converter having access to a first backup program and a second backup program and a storage, wherein the backup copy converter performs operations, the operations comprising:

determining a plurality of backup copies of versions of an object created using the first backup program, wherein the object has an object name;

using the first backup program to restore at least one of the backup copies to a restored version of the object having a name different from the object name;

using the second backup program to create a backup copy of each restored version of the object, wherein the first and second backup programs are from different vendors;

assigning a name of a designated object to each backup copy created using the second backup program; and updating metadata of each backup copy created using the second backup program with metadata for the designated object.

24. The article of manufacture of claim 23, wherein the designated object whose name is assigned to each backup copy created using the second backup program comprises the object from which the plurality of backup copies were created using the first backup program.

25. The article of manufacture of claim 23, wherein the object from which the plurality of backup copies were created using the first backup program comprises a first object having a first object name, wherein the designated object whose name is assigned to each backup copy created using the second backup program comprises a second object having a second object name different from the first object name.

26. The article of manufacture of claim 23, wherein the metadata of the backup copies created using the second backup program is updated with at least one storage management policy indicated in the metadata of the designated object to replace the at least one storage management policy in the backup copies created using the second backup program.

27. The article of manufacture of claim 26, wherein the at least one storage management policy is a member of a set of storage management policies comprising an object expiration, a migration policy, and a backup policy.

28. The article of manufacture of claim 23, wherein the metadata of each backup copy created using the second backup program is updated with metadata in the designated object indicating an object name of the designated object to replace metadata in each backup copy created using the second backup program indicating the object name of the backup copy.

29. The article of manufacture of claim 23, wherein the metadata of each backup copy created using the second backup program is updated with metadata in the designated object indicating a directory structure in which the designated object resides.

30. The article of manufacture of claim 23, wherein the metadata of each backup copy created using the second backup program is updated with metadata in the designated object related to a storage location of the designated object.

31. The article of manufacture of claim 23, wherein the operations further comprise:

updating a backup copy inventory to indicate that each backup copy created using the second backup program has the name of the designated object.

32. The article of manufacture of claim 23, wherein the operations further comprise:

deleting each restored version of the object restored using the first backup program.

33. The article of manufacture of claim 23, wherein users have access to the object during the operations of using the first backup program to restore each backup copy to the restored version of the object, using the second backup program to create the backup copy of each restored version, assigning the name of the designated object to each backup copy, and updating the metadata of each backup copy.

* * * * *